United States Patent [19]
Ziegler

[11] Patent Number: 6,094,922
[45] Date of Patent: Aug. 1, 2000

[54] VACUUM-INSULATED REFRIGERANT LINE FOR ALLOWING A VACCUM CHAMBER SYSTEM WITH WATER-VAPOR CRYOCOIL COMPRESSOR TO BE LOCATABLE OUTSIDE CLEANROOM

[76] Inventor: Alex R. Ziegler, 16200 Brooke Acres Dr., Los Gatos, Calif. 95032

[21] Appl. No.: 09/150,511

[22] Filed: Sep. 9, 1998

[51] Int. Cl.[7] .................................................. F17C 13/00
[52] U.S. Cl. .......................................... 62/50.7; 138/114
[58] Field of Search ................................. 62/50.7, 55.5; 138/149, 148, 111, 114, DIG. 4

[56] References Cited

U.S. PATENT DOCUMENTS

| | | | |
|---|---|---|---|
| 3,466,886 | 9/1969 | Doose et al. | 62/50.7 |
| 3,904,394 | 9/1975 | Prast et al. | 62/50.7 |
| 4,036,618 | 7/1977 | Leonard et al. | 62/55 |
| 4,176,526 | 12/1979 | Missimer | 62/278 |
| 4,194,536 | 3/1980 | Stine et al. | 138/149 |
| 4,303,105 | 12/1981 | Rohner | 138/149 |
| 4,515,397 | 5/1985 | Nowobilski et al. | 285/47 |
| 4,535,597 | 8/1985 | Missimer et al. | 62/55.5 |
| 4,546,798 | 10/1985 | Porta | 138/149 |
| 4,597,267 | 7/1986 | Forrest | 62/55.5 |
| 5,135,265 | 8/1992 | Bouscher et al. | 285/137.1 |
| 5,261,250 | 11/1993 | Missimer | 62/55.5 |
| 5,307,639 | 5/1994 | Boissin | 62/50.7 |
| 5,400,602 | 3/1995 | Chang et al. | 62/50.7 |
| 5,408,848 | 4/1995 | Weng | 62/502 |
| 5,570,723 | 11/1996 | Hwang et al. | 138/111 |
| 5,626,167 | 5/1997 | Streit | 138/118.1 |
| 5,678,724 | 10/1997 | Boffito et al. | 220/421 |
| 5,725,028 | 3/1998 | Cleland | 138/149 |

*Primary Examiner*—William Doerrler
*Attorney, Agent, or Firm*—Richard B. Main

[57] ABSTRACT

A cryopump-type water-vapor removal system comprising a vacuum chamber for location within a device-fabrication cleanroom or other similar fabrication area, and a Meissner-type cryocoil for condensation of atmospheric water vapor in the atmosphere inside the chamber. A refrigerant compressor-evaporator is for location outside the device-fabrication cleanroom and is separated from the cryocoil by at least twenty feet. A refrigerant umbilical cord connects between and includes a flexible outer sheath providing for maintaining a thermal-insulation vacuum within. Flexible smooth-bore refrigerant suction and discharge tubes are disposed in the thermal-insulation vacuum of the umbilical. The suction tube has a larger diameter than the discharge to provide for an expansion of the refrigerant that occurs in the cryocoil. Non-turbulent flow through the suction and discharge tubes in the refrigerant umbilical cord may be controlled by use of a smooth-bore wall. Inside-to-outside thermal conduction may be controlled by disposing the suction and discharge tubes inside the thermal-insulation vacuum and reflective aluminized MYLAR (super insulation).

6 Claims, 2 Drawing Sheets

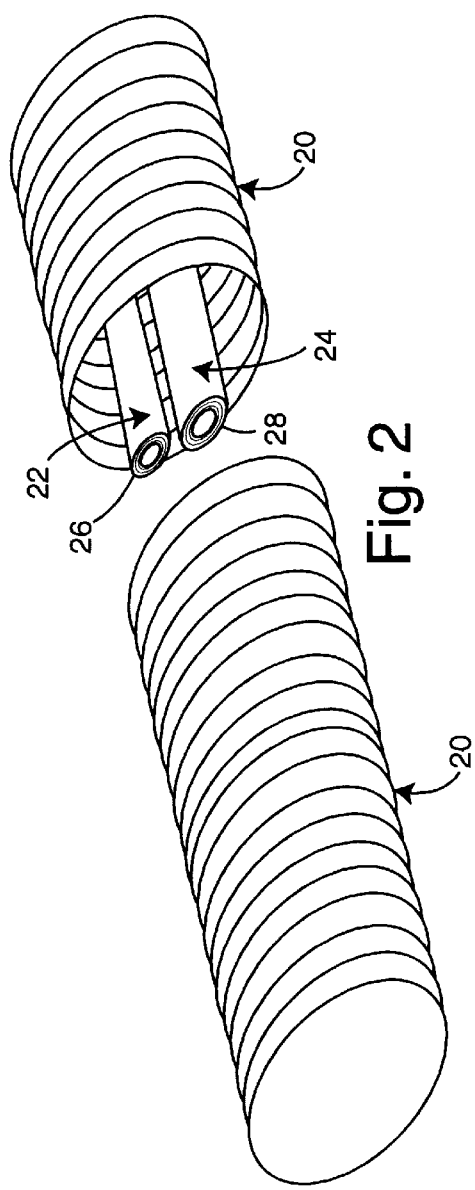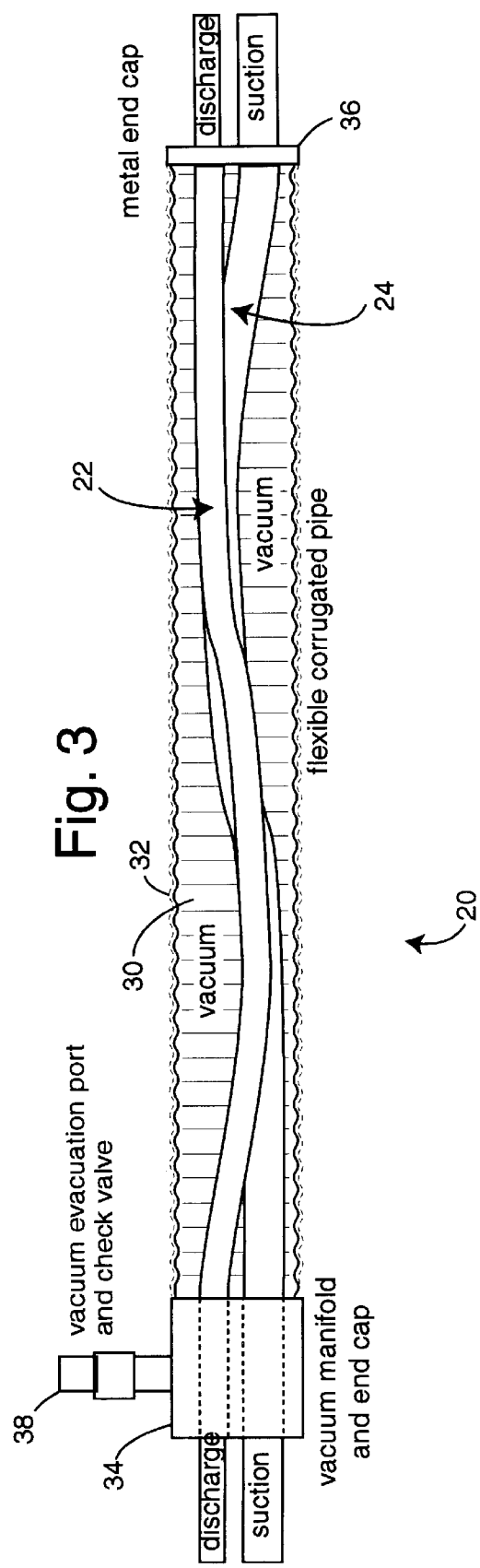

VACUUM-INSULATED REFRIGERANT LINE FOR ALLOWING A VACCUM CHAMBER SYSTEM WITH WATER-VAPOR CRYOCOIL COMPRESSOR TO BE LOCATABLE OUTSIDE CLEANROOM

BACKGROUND OF THE INVENTION

1. Field of the Invention

The invention relates generally to semiconductor and media fabrication equipment and more specifically to vacuum-insulated refrigerant line for allowing vacuum chamber systems with water-vapor cryocoil compressors to be located outside a device-fabrication cleanroom and to low heat loss interconnecting pipes that make such remote location possible.

2. Description of the Prior Art

Semiconductor and media devices are fabricated in "cleanrooms" that have high construction costs per square foot. It is therefore worthwhile and desirable to minimize the number of processing equipment devices designed to be inside this expensive space, as well as to miniaturize the devices that are absolutely necessary.

Vacuum chambers are very commonly used in thin-film storage media, flat panel display and semiconductor device fabrication cleanrooms. Much of the actual fabrication occurs while such devices are in a vacuum. Roughing, or mechanical, vacuum pumps can do a large part of the evacuation of the vacuum chambers, but the very high vacuums required often demand the use of more exotic pumps as well, e.g., cryopumps.

Water vapor can be removed from a pumped-down vacuum chamber by a cryopump to help improve the vacuum. For example, Polycold Systems, Inc. (San Rafael, Calif.) uses so-called "Meissner" cryocoils inside vacuum chambers to precipitate water vapor out of the internal atmosphere by condensation. The condensed water molecules therefore no longer contribute to the gas volume inside the chamber.

A refrigerant, such as FREON or ammonia, is compressed and pumped through a discharge line by a compressor to the cryocoil. It absorbs heat, and the heated refrigerant is returned in a suction line back to the compressor through an evaporator. In semiconductor cleanroom applications, the compressor alone can consume several square feet of floor space.

In order to improve efficiency, the suction and discharge pipe connections between a cryopump compressor and the cryocoil are usually foam-insulated and paired in a single covering. Pipes with simple foam-insulated wrappings can have heat leakages of fifteen to twenty-five BTUs per foot per hour. Pipes with rigid, high quality insulation can reduce this to about ten to twelve BTUs per foot per hour. Some excess heat leakage can be compensated for by using a larger compressor-evaporator, but this alone is expensive. Larger, more powerful units also require more of the expensive cleanroom floor-space. The maximum pipe runs in prior art equipment have been limited to just a few yards. A typical Polycold system uses eight foot pipe runs. Beyond fifteen feet, the usual solution is to install larger compressors and more expensive rigid-foam insulation.

The choices of materials and methods available to construct such piping between the compressor-evaporator and cryocoil is severely limited. The outer covering and the installation techniques must be "clean". They must not contribute significant contamination particles to the atmosphere of the cleanroom during construction or use. The outer covering, if it is to contain a high-quality insulator such as a vacuum, must be rigid enough to not collapse under the vacuum, and yet flexible enough to allow routing of the pipe during installation. The discharge and suction lines themselves also need to be very resistant to bursting, as the internal operating pressures can go as high as several hundred pounds-per-square-inch-gauge (PSIG).

SUMMARY OF THE PRESENT INVENTION

It is therefore an object of the present invention to provide vacuum-insulated recirculating refrigerant lines for a cryopump-type water-vapor removal system for a vacuum chamber in which the compressor-evaporator can be reasonably located outside the immediate cleanroom area.

It is a further object of the present invention to provide a low-heat leakage refrigerant umbilical compressor line that can extend beyond twenty feet without unacceptable consequences or expense in the operation of a cryopump-type water-vapor removal system.

Briefly, a cryopump-type water-vapor removal system embodiment of the present invention comprises a vacuum chamber located within a device-fabrication cleanroom, and a Meissner-type cryocoil for the condensation of water vapor in the atmosphere inside the chamber. A refrigerant compressor-evaporator is located outside the device-fabrication cleanroom and is separated from the cryocoil by at least twenty feet. A refrigerant umbilical cord connects between and includes a flexible outer sheath providing for the maintenance of a thermal-insulation vacuum within. Flexible smooth-bore refrigerant suction and discharge tubes are disposed in the thermal-insulation vacuum of the umbilical. The suction tube has a larger diameter than the discharge that provides for an expansion of the refrigerant that occurs in the cryocoil. Inside-to-outside thermal conduction is controlled by disposing the suction and discharge tubes inside the thermal-insulation vacuum.

An advantage of the present invention is that a cryopump-type water-vapor removal system is provided that allows some of the components to be placed outside the cleanroom or remote to the vacuum chamber.

Another advantage of the present invention is that a refrigerant umbilical connection is provided for a cryopump-type water-vapor removal system that allows the compressor to be separated from the cryocoil by more than twenty feet.

A further advantage of the present invention is that a refrigerant umbilical connection is provided that has a thermal leakage that does not exceed one BTU, or one-third watt, per foot, per hour.

These and other objects and advantages of the present invention will no doubt become obvious to those of ordinary skill in the art after having read the following detailed description of the preferred embodiment which is illustrated in the drawing figures.

IN THE DRAWINGS

FIG. 2 is a perspective cut-away diagram of the refrigerant umbilical cord of FIG. 1, and is intended to show the insulative laminated wrapping on the discharge and suction tubes; and FIG. 3 is a cross-sectional view of the refrigerant umbilical cord of FIGS. 1 and 2 and shows the vacuum evacuation and seal-off valve and manifold details.

DETAILED DESCRIPTION OF THE PREFERRED EMBODIMENTS

Figure 1:
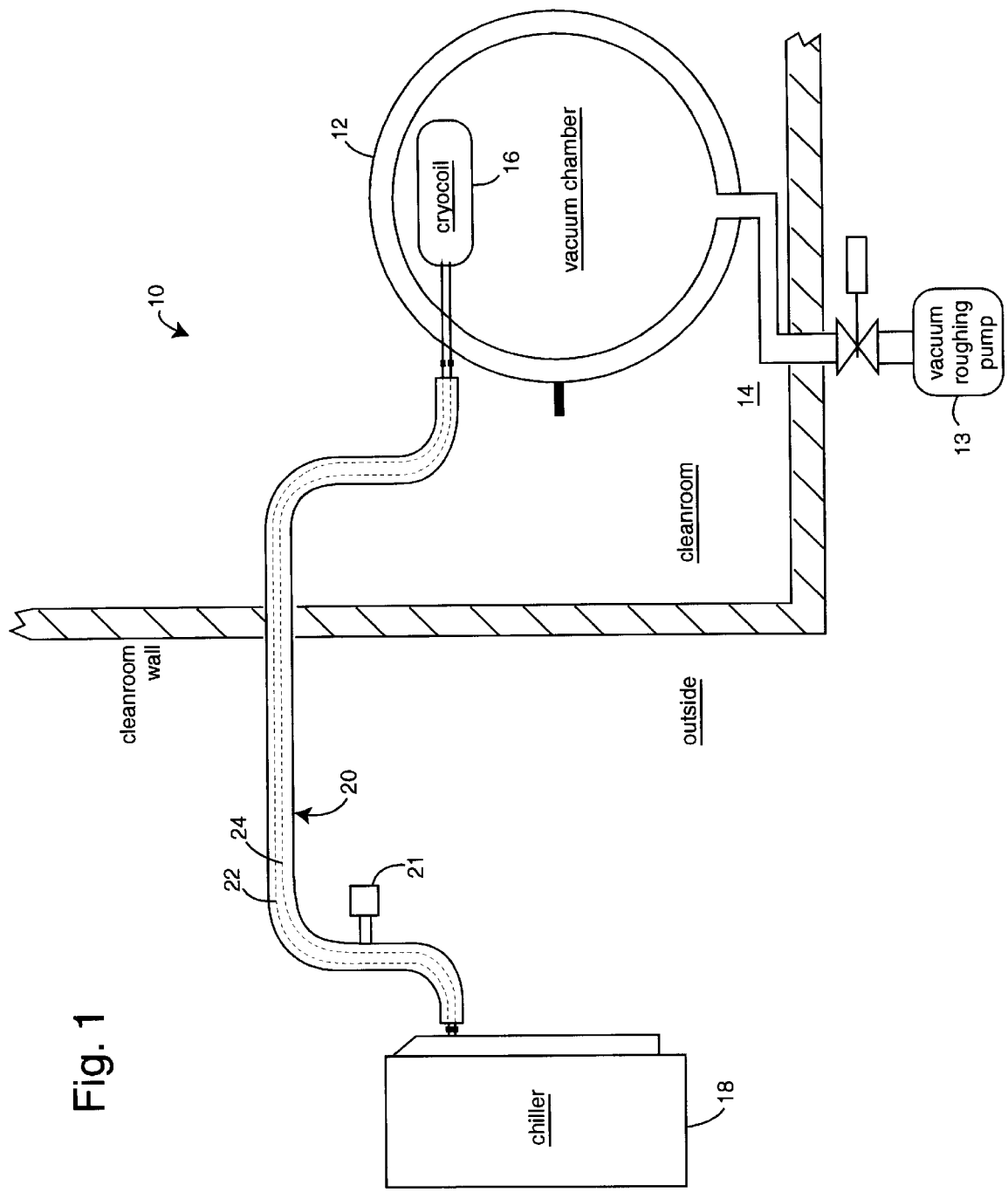
FIG. 1 is a diagram of a cryopump-type water-vapor removal system embodiment of the present invention for a vacuum chamber.

FIG. 1 illustrates a cryopump-type water-vapor removal system embodiment of the present invention for a vacuum chamber, and is referred to by the general reference numeral 10. The system 10 comprises a vacuum chamber 12 and a vacuum "roughing" pump 13 located outside a device-fabrication cleanroom 14. Such includes a Meissner-type cryocoil 16 for the condensation of water vapor in the atmosphere inside the chamber 12. A refrigerant compressor-evaporator 18 is located outside the device-fabrication cleanroom 14. As will often be the case when installing it outside the cleanroom, the refrigerant compressor-evaporator 18 is separated from the cryocoil 16 by at least twenty feet.

Forty to fifty feet of separation is also possible. The principle concern is how much heat leakage occurs in a refrigerant umbilical cord 20, which includes a flexible outer sheath that provides for the maintenance of a thermal-insulation vacuum within, e.g., to keep the thermal leakage to under one BTU, or one-third watt, per linear foot per hour. A vacuum evacuation port/valve 21 attaches to the refrigerant umbilical cord 20. The vacuum evacuation port/valve 21 allows an external pump to establish a vacuum within the refrigerant umbilical cord 20 and seals such vacuum thereafter once the pump is disconnected.

As shown in greater detail in FIG. 2, a flexible smooth-bore refrigerant discharge tube 22 is disposed in the thermal-insulation vacuum of the refrigerant umbilical cord 20 and provides for a flow of refrigerant from the refrigerant compressor-evaporator to the cryocoil. Similarly, a flexible smooth-bore refrigerant suction tube 24 is also disposed in the thermal-insulation vacuum. It provides for a return flow of refrigerant from the cryocoil to the refrigerant compressor-evaporator 18.

Embodiments of the present invention are preferably such that the suction tube 24 has a larger diameter than the discharge tube 22. This is intended to provide for an expansion of the refrigerant that occurs in the cryocoil. Typical tube outside diameters are 5/16" for the suction tube 24 and ½" for the discharge tube 22. In less common, but still typical combinations, tube outside diameters are ¼" and ⅜" for the suction tube 24, that are paired with ⅜" and ⅝" respectively for the discharge tube 22.

The thermal leakage through the refrigerant umbilical cord 20 to the outside environment is substantially controlled by providing an evacuation of the space surrounding the suction discharge. The refrigerant turbulence in the tubes 22 and 24 is substantially controlled by providing a non-turbulent flow by use of smooth bore walled tubing. For example, flexible copper tubing universally used in water plumbing in the United States can provide good results. However internal pressures can exceed 300 PSIG, so a good quality tubing is required.

The overall inside-to-outside thermal conduction is controlled by placing the suction and discharges tubes 24 and 22 inside the thermal-insulation vacuum. Therefore a non-collapsible and yet flexible sheathing is needed. Good results have been obtained with the use of corrugated thin-wall stainless steel pipe. A polyolefin outer covering is preferred to help promote cleanroom particle control as it is easily cleaned, does not collect dust, can be applied as a heat-shrink tubing, and acts as an outer protective coating.

The thermal leakage of the refrigerant umbilical cord 20 to the outside environment should be less than one British Thermal Unit (BTU), per linear foot, per hour. This thermal leakage can be further controlled by limiting the inside-to-outside thermal-radiation mechanism by constructing minimized surface areas for the inside of the refrigerant umbilical cord and the suction and discharge tubes. The thermal leakage is further controlled by wrapping, in FIG. 2, each of the discharge and suction tubes 22 and 24 respectively in a laminated metal-and-insulator sheathing 26 and 28. For example, aluminized MYLAR can be used. It is preferable to keep the discharge and suction tubes 22 and 24 from contacting the inner walls of the outer corrugated pipe, in order to prevent thermal leakage by heat conduction. To achieve this, an extremely thin layer of fiberglass insulation is also wrapped with the aluminized MYLAR.

FIG. 3 illustrates the refrigerant umbilical cord 20 in still greater detail. The overall length may be well over twenty feet and up to sixty feet or longer and have a thermal leakage less than one BTU per foot per hour. The refrigerant umbilical cord 20 has a corrugated stainless steel pipe 30 with a plastic polyolefin skin 32. To obtain maximum life of the vacuum annulus space following the evacuation process, a molecular gettering material is added which acts as a molecular pump for the outgassing of molecules from the walls of the pipe. A vacuum is maintainable inside because a manifold 34 and an end cap 36 seal each end. A vacuum check valve 38 provides a one-way connection to the high vacuum evacuation pump 21. The discharge and suction tubes 22 and 24 are each wrapped in the laminated metal-and-insulator sheathing 26 and 28 detailed in FIG. 2.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A vacuum-insulated refrigerant line, comprising:
   a non-collapsible flexible outer sheath for maintaining a thermal-insulation vacuum within;
   a vacuum manifold and end cap that are sealed to opposite ends of a flexible outer sheath, and each providing side-by-side discharge and suction tube connections, and further providing a vacuum-port for a vacuum-pump that generates said thermal-insulation vacuum;
   a flexible smooth-bore refrigerant discharge tube disposed in the flexible outer sheath and for providing a flow of refrigerant from a refrigerant compressor-evaporator, and connected at each end to said discharge tube connections; and
   a flexible smooth-bore refrigerant suction tube disposed in said vacuum-insulation and for providing for a flow of refrigerant from said refrigerant compressor-evaporator and connected at each end to said suction tube connections;
   wherein, no intermediate joints are included and said flexible smooth-bore refrigerant discharge tube and supply tube are allowed to move freely inside the flexible outer sheath; and
   wherein, the thermal leakage to the outside environment is less than one British Thermal Unit (BTU), per linear foot of said refrigerant line, per hour.

2. The line of claim 1, wherein:
   the suction tube has a larger inside diameter than does the discharge tube and such larger inside diameter provides for an expansion of the refrigerant that occurs in said cryocoil, and such is in the approximate ratio of ⅜ to ¼ and also ⅝ to ⅜.

3. A cryopump-type water-vapor removal system for a vacuum chamber, comprising:

a vacuum chamber for location within a device-fabrication cleanroom and including a Meissner-type cryocoil for condensation of atmospheric water vapor;

a refrigerant compressor-evaporator for location outside said device-fabrication cleanroom and separated from said cryocoil;

a refrigerant umbilical cord including a flexible outer sheath for maintaining a thermal-insulation vacuum within;

a flexible smooth-bore refrigerant discharge tube disposed in said thermal-insulation vacuum and for providing for a flow of refrigerant from the refrigerant compressor-evaporator to said cryocoil; and a flexible smooth-bore refrigerant suction tube disposed in said thermal-insulation vacuum and for providing for a flow of refrigerant from said cryocoil to the refrigerant compressor-evaporator, the suction tube has a larger diameter than the discharge to provide for an expansion of the refrigerant in said cryocoil; and wherein, fluid turbulence through the refrigerant umbilical cord suction and discharge tubes may be controlled by use of a smooth-bore wall, and inside-to-outside thermal conduction may be controlled by disposing the suction and discharge tubes inside said thermal-insulation vacuum.

4. The cryopump-type water-vapor removal system of claim 3, wherein:

the inside of the refrigerant umbilical cord and the suction and discharge tubes are constructed with minimized surface areas for limiting inside-to-outside thermal radiation such that said thermal leakage is less than one BTU per linear foot per hour.

5. The cryopump-type water-vapor removal system of claim 3, wherein:

the inside of the refrigerant umbilical cord and the suction and discharge tubes are constructed with surfaces that are ineffectual thermal radiators and absorbers for limiting inside-to-outside thermal radiation such that said thermal leakage is less than one BTU per linear foot per hour.

6. The cryopump-type water-vapor removal system of claim 3, further comprising:

a laminated metal-and-insulator sheathing in which each of the suction and discharge tubes are disposed, to provide reduced levels of said thermal leakage by decreasing radiation thermal transfer from inside to outside.

* * * * *